UNITED STATES PATENT OFFICE.

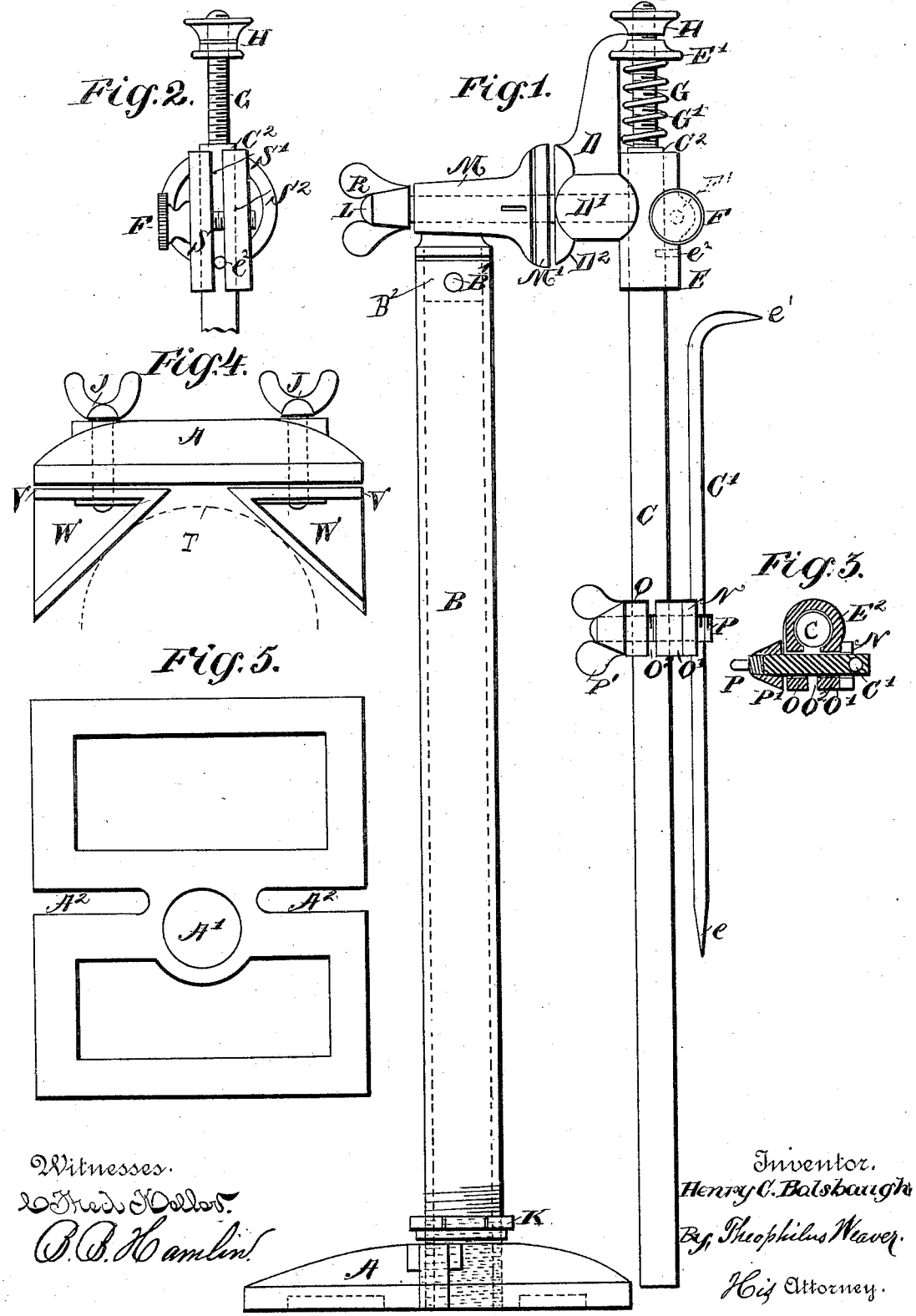

HENRY C. BALSBAUGH, OF HARRISBURG, PENNSYLVANIA.

SURFACE-GAGE.

SPECIFICATION forming part of Letters Patent No. 380,740, dated April 10, 1888.

Application filed May 21, 1887. Serial No. 239,027. (No model.)

*To all whom it may concern:*

Be it known that I, HENRY C. BALSBAUGH, a citizen of the United States, residing at Harrisburg, in the county of Dauphin and State of Pennsylvania, have invented new and useful Improvements in Surface-Gages, of which the following is a specification.

My invention relates to machinists' tools for gaging surfaces, for testing the same relative to an assumed line or surface, whether the tested surface be at a height above the assumed line or in depth below the same, the instrument consisting, mainly, of a stand provided at top with a reversible joint in which is adjustably supported a stem, on which latter is adjustably supported the surface-testing needle by means of a clamp, which secures itself and the needle at any point by a single binding-nut, and also of certain guide-pieces removably supported on the under side of the base of the stand, whereby it is adapted to rest on a cylindrical body and align with the axis thereof, as will be hereinafter more fully set forth, reference being had to the annexed drawings, of which—

Figure 1 is a side elevation of my invention; Fig. 2, a front elevation of the reversible joint; Fig. 3, a cross-section of the needle-clamp; Fig. 4, an end view of the base with guide-pieces thereon; Fig. 5, a bottom view of the recessed base.

In the description following similar reference-letters denote the same parts in all the views.

Letter A denotes the base, which is oval on top and has therein the threaded vertical socket A', into which is screwed the tubular column B, having on it the jam-nut K, whereby it is kept fixed in said socket against unscrewing. Said socket is located a little aside from the middle of the base, and the latter is made massive, that the weight of the joint D and the needle-carrying stem C, supported on the column, shall be counterbalanced by the weight of the oppositely-extended part of the base to favor stability in the instrument. Into the top of said column B is fitted the shank $B^2$ of the cross-head M. The shank is held fixedly in the column by the pin or screw B'. Said cross-head has in it a horizontal bore, in which works the pivotal shaft or bolt L, which is the means for attaching the cross-head to the reversible joint D, their abutting ends M' and $D^2$ being enlarged bearings whose faces are at right angles to the axis of said bolt, that the joint shall swing in a vertical plane while being adjusted. Said bolt may be a stub chilled into the joint in casting, and has upon its outer threaded end the nut R, which, bearing against the opposite end of the cross-head, draws to bring it and said joint interlocked when taut. Said bolt may, however, be screwed into the part D', the nut R then being its head. The joint D has on it the transverse socket E and the arm E', in which is a bearing axially in line with said socket, the latter being the bearing for the round stem C and that in said arm being for the reduced part G of the stem. Around the part G is applied the spiral spring G', having its foot end resting against the shoulder $C^2$, formed on the stem in reducing its size, and having its opposite end exerted against the under side of said arm, as shown. The object of the spring is to hold the retaining or adjusting nut H to its seat on the arm E', and thus hold the said stem correctly in its bearings when the screw F is slack and the joint D stands inverted, as may be the case when the capacity of the gage is fully utilized to test an elevated surface, as on top of a body reaching high above the planer-bed.

The socket E has in its wall the longitudinal slot S', and the cleft-abutments S $S^2$ are embraced by the binding-screw F, whose threaded point travels in a threaded hole in the abutment $S^2$, while its shank works freely in the opposite abutment, S, thus bringing up the latter by the screw-head when the screw is taut. The stem C is fitted snugly to the bearing in the socket E, but slides longitudinally therein when said screw F is slack. When the screw is taut, the socket clamps the stem taut in it.

To the stem C is clamped the needle C' by means of the clamp $E^2$, which is also made with a longitudinal slot, $O^2$, in its wall, thus forming the parallel abutments O O', through eyes in which is inserted the headless screw-bolt P, whose threaded point has on it the thumb-nut P', whereby said abutments are drawn toward each other to clamp onto or hug the stem C. In lieu of a head on said bolt it has in it an eye through which is inserted the needle C', whose body bears against the pillow-block N, which is formed with a seat on its outer face, which is conformed to said body and with a central eye through which said bolt passes, thus anchoring the block as a washer to the abutment O', against which the under side of the block bears. The nut P' therefore serves to clamp fast both the needle at any angle to which its points may be turned by revolving said block about said bolt and also the clamp E² by its abutments inward, thus securing it on the stem C at any point.

The points of the needle C' are either straight or bent, as shown at $e$ and $e'$, respectively, to be applicable to both even and uneven or offset surfaces.

When greater height in the stand is desired, the column B may be lengthened below by splicing to it a piece of similar pipe by means of an ordinary pipe-coupling, the nut K being transferred to the added piece, which is threaded accordingly at its ends. In the slot S' works the pin $e^2$ in the stem C to keep it from turning.

In the base A are formed the similar opposite slots, A², in the middle thereof, through each of which slots reaches down a screw-bolt, J, whose shoulder bears on a flat part on top of said base, while its threaded point travels in the top plate, V, of one of the similar guide-pieces W, thus adjustably clamping the same to the under side of said base for adapting it to set or rest on a cylindrical body, as indicated at T. The inner faces of said pieces are beveled or are of slant V form, having the apices of the pieces parallel with each other, or so made that they may be set parallel by revolving them at the pivotal attaching-bolts J, the upper inner edges being straight and extending across the entire length of the base. Said edges therefore meet throughout when the pieces are adjusted inward, and they may be readily set apart to be parallel at other points by means of the parallel edges of a machinist's scale. The inner faces of the said pieces are shown as planes, but it is unnecessary to have the planes to occupy the whole of said faces, as sections thereof may be omitted if only sufficient bearing-points be kept of the same, and the ends of the pieces may be open or closed at pleasure, as the inner faces and edges only are used.

I claim—

1. In a surface-gage, the stand composed of the column B, the base A, having secured therein the column by a screw-joint, the nut K on the column for jamming onto the base and interlocking the parts, and of the cross-head M, formed with the shank B², whereby it is secured removably on said column, it having a longitudinal bore, in combination with the joint D, held abutted to the correspondingly-enlarged outer end of the cross-head by means of the axial bolt L, inserted in said bore and provided with the binding thumb-nut R, substantially as and for the purpose set forth.

2. In a surface-gage, the combination, with the stand composed of the base A, column B, cross-head M, and nut K, of the stem-holding joint D, pivoted to said cross-head of said stand to swing in a vertical plane and be clamped fixedly by means of the binding-nut R on the axial bolt L, uniting said joint to the stand, of the round stem C, sleeved in the socket E on said joint, and having the reduced part G thereof inserted through the arm E', formed on the upper end of said joint, of the spring G', applied around said reduced part between the shoulder formed in reducing the stem and the under side of said arm, and the adjusting-nut H on the threaded upper end of said stem, the same bearing exteriorly on said arm and by aid of said spring regulating the position of said stem in the socket E when not clamped fast therein in the act of adjusting the needle C' to test a surface properly, substantially as set forth.

3. In a surface-gage, the combination, with the stand, of the instrument having the cross-head M thereon and the reversible joint D, pivoted thereto to swing in a vertical plane and be clamped rigidly in position after adjustment, said joint being provided with the arm E', and the socket E, formed with the longitudinal slot S' in its wall, of the stem C, having its reduced part G inserted in a bearing in said arm and its round body sleeved in said slotted socket, of the spring G', applied around said part G between said arm and the shoulder C² on said stem, of the nut H on the said stem's reduced and threaded part for adjusting it longitudinally, and of the binding-screw F, working loosely in the part S of the wall of the socket E, and having its threaded point traveling in the part S² of said wall for springing said parts closer together and clamping the round body of the stem in said socket, substantially as and for the purposes set forth.

4. In a surface-gage, the combination, with the round stem C, adjustably mounted on the stand of the instrument, and suspending thereby the testing-needle, of the clamp E², embracing said stem and formed with the abutments O O', having the slot O² between them, and having the screw-bolt P inserted through holes formed in the abutments, of the thumb-nut P' on the threaded end of said bolt, of the needle C', inserted through an eye in the bolt in lieu of the head thereof, and of the pillow-block N, having a central eye with said bolt therein, and a seat on its face, in which said needle is held in position when said block and clamp are drawn taut in driving taut said nut, substantially as and for the purposes set forth.

5. In a surface-gage, the combination, with the base A, formed with the opposite corresponding slots, A², of the guide-pieces W, formed, as shown, with parallel edges, and similarly-beveled inner faces adapted to rest tangentially upon a cylindrical body and to align parallel with the axis of the same, and of the bolts J, inserted through said slots and traveling in tapped holes in the top plates, V, of said pieces for clamping the same adjustably to the under side of said base, substantially as and for the purpose set forth.

HENRY C. BALSBAUGH.

Attest:
THEOPHILUS WEAVER,
A. BRACKENRIDGE.